United States Patent
Freed

(10) Patent No.: US 11,784,959 B2
(45) Date of Patent: *Oct. 10, 2023

(54) MESSAGE TRANSFER AGENT ARCHITECTURE FOR EMAIL DELIVERY SYSTEMS

(71) Applicant: Oracle International Corporation, Redwood Shores, CA (US)

(72) Inventor: Edwin Earl Freed, Claremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,446

(22) Filed: Jun. 3, 2022

(65) Prior Publication Data
US 2022/0400096 A1  Dec. 15, 2022

Related U.S. Application Data

(63) Continuation of application No. 17/345,520, filed on Jun. 11, 2021, now Pat. No. 11,381,537.

(51) Int. Cl.
*G06F 15/16* (2006.01)
*H04L 51/48* (2022.01)
(Continued)

(52) U.S. Cl.
CPC .......... *H04L 51/48* (2022.05); *H04L 47/6225* (2013.01); *H04L 67/56* (2022.05)

(58) Field of Classification Search
CPC ...... H04L 51/48; H04L 67/56; H04L 47/6225
(Continued)

(56) References Cited

U.S. PATENT DOCUMENTS 7,080,123 B2 * 7/2006 Freed .................... H04L 51/212
707/999.005
7,089,241 B1 8/2006 Alspector et al.
(Continued)

FOREIGN PATENT DOCUMENTS

WO 2018140975 A1 8/2018

OTHER PUBLICATIONS

U.S. Appl. No. 17/345,520, Corrected Notice of Allowability dated Apr. 11, 2022, 2 pages.
(Continued)

*Primary Examiner* — Alicia Baturay
(74) *Attorney, Agent, or Firm* — Kilpatrick Townsend & Stockton LLP

(57) ABSTRACT

An email message delivery system is described that provides a fast and reliable managed email delivery service using MTAs and proxy servers. An email message is selected by an MTA for processing. The MTA determines a sender and an intended recipient associated with the email message. The MTA then identifies a pool of usable source internet protocol addresses for the email message based on the sender and selects a particular source IP address from the pool. The MTA then identifies a particular proxy server that is configured to handle the selected particular source IP address and communicates to the particular proxy server, information including the particular source IP address and the destination IP address. The MTA then transmits the email message to the destination IP address using a connection established by the proxy server between the particular source IP address and the destination IP address.

20 Claims, 8 Drawing Sheets

(51) Int. Cl.
*H04L 67/56* (2022.01)
*H04L 47/62* (2022.01)

(58) Field of Classification Search
USPC .................................................. 709/206
See application file for complete search history.

(56) References Cited

U.S. PATENT DOCUMENTS

| | | | |
|---|---|---|---|
| 7,580,982 B2 | 8/2009 | Owen et al. | |
| 7,764,951 B2 | 7/2010 | Patel et al. | |
| 8,024,803 B1 | 9/2011 | Cooley et al. | |
| 8,028,031 B2 | 9/2011 | Colvin et al. | |
| 8,606,867 B2 | 12/2013 | Deshpande et al. | |
| 8,627,103 B2* | 1/2014 | Katzenbeisser | G06F 21/6218 |
| | | | 713/189 |
| 9,177,293 B1 | 11/2015 | Gagnon et al. | |
| 9,210,453 B1* | 12/2015 | Cloonan | H04N 21/2385 |
| 9,218,479 B2* | 12/2015 | Collinge | G06F 21/44 |
| 9,349,026 B2* | 5/2016 | Gianniotis | H04L 63/0407 |
| 9,501,746 B2 | 11/2016 | Prakash | |
| 9,794,341 B2* | 10/2017 | Manohar | H04L 67/1097 |
| 9,819,485 B2* | 11/2017 | Chastain | H04L 63/062 |
| 9,979,692 B2* | 5/2018 | Freed | H04L 51/226 |
| 10,020,940 B2* | 7/2018 | Freed | H04L 9/0861 |
| 10,284,579 B2* | 5/2019 | Goutal | H04L 63/1483 |
| 11,019,079 B2* | 5/2021 | Goutal | H04L 63/1416 |
| 11,070,380 B2* | 7/2021 | Kim | H04W 12/069 |
| 11,240,193 B2* | 2/2022 | O'Brien | G06N 3/08 |
| 11,381,537 B1* | 7/2022 | Freed | H04L 47/6225 |
| 11,399,032 B2* | 7/2022 | Greevy | H04L 63/1408 |
| 11,483,270 B2 | 10/2022 | Freed | |
| 2005/0015626 A1 | 1/2005 | Chasin | |
| 2006/0129644 A1 | 6/2006 | Owen et al. | |
| 2006/0149823 A1 | 7/2006 | Owen et al. | |
| 2007/0038705 A1 | 2/2007 | Chickering et al. | |
| 2008/0172468 A1 | 7/2008 | Almeida | |
| 2008/0201433 A1 | 8/2008 | McDonald | |
| 2009/0285474 A1 | 11/2009 | Berteau | |
| 2009/0327430 A1 | 12/2009 | Colvin et al. | |
| 2010/0057869 A1* | 3/2010 | Stavrou | H04L 51/42 |
| | | | 709/206 |
| 2010/0306856 A1 | 12/2010 | Suciu et al. | |
| 2011/0045821 A1 | 2/2011 | Tyce et al. | |
| 2012/0198233 A1* | 8/2012 | George | H04L 51/234 |
| | | | 713/168 |
| 2013/0238719 A1 | 9/2013 | Gourevitch et al. | |
| 2015/0312186 A1 | 10/2015 | Giura et al. | |
| 2016/0277336 A1 | 9/2016 | Sachtjen et al. | |
| 2017/0063880 A1* | 3/2017 | Freed | H04L 63/1483 |
| 2017/0142082 A1* | 5/2017 | Qian | G06F 21/62 |
| 2018/0219820 A1 | 8/2018 | Kramer et al. | |
| 2020/0045005 A1 | 2/2020 | Svec | |
| 2020/0404005 A1 | 12/2020 | Greevy | |

OTHER PUBLICATIONS

U.S. Appl. No. 17/345,520, Notice of Allowance dated Mar. 7, 2022, 10 pages.
U.S. Appl. No. 17/458,094, Non-Final Office Action dated Mar. 7, 2022, 11 pages.
U.S. Appl. No. 17/458,094, Notice of Allowance dated Aug. 18, 2022, 18 pages.
International Application No. PCT/US2021/037180, International Search Report and Written Opinion dated Feb. 23, 2022, 12 pages.
International Application No. PCT/US2021/047895, International Search Report and Written Opinion dated Dec. 2, 2021, 12 pages.

* cited by examiner

MESSAGE TRANSFER AGENT ARCHITECTURE FOR EMAIL DELIVERY SYSTEMS

CROSS-REFERENCE TO RELATED APPLICATION

The present application is a continuation of, and claims the benefit of and priority to, U.S. patent application Ser. No. 17/345,520, filed on Jun. 11, 2021, the entire contents of which are incorporated herein by reference for all purposes.

BACKGROUND

Several cloud service providers offer cloud-based email delivery services that provide a fast and reliable solution for customers of these services to send high volumes of emails to their intended recipients. These emails may include marketing emails, transactional emails, alert emails, verification emails, and other types of emails. An example of such an email delivery service is the Oracle Cloud Infrastructure (OCI) Email Delivery service provided by Oracle Corporation. The OCI Email Delivery service provides a platform that uses key deliverability metrics to ensure the best sending reputation possible for customer's emails.

Due to the increasing popularity of email delivery services, the volume of emails processed by these services continues to rise rapidly. Existing architectures implementing these services need to be improved to make the services scalable, resilient, and reliable.

BRIEF SUMMARY

This disclosure relates generally to cloud-based email delivery services. More specifically, but not by way of limitation, an improved architecture using Mail Transfer Agents (MTAs) and proxy servers is described that improves the scalability and reliability of the systems implementing the email delivery services.

In certain embodiments, an email message delivery system providing an email delivery service is disclosed. The email message delivery system comprises an MTA and a proxy server. The MTA selects from a message queue, a first email message for processing. The message queue comprises a set of email messages received from a set of senders. The set of senders correspond to a set of subscribers (tenants or customers) of the email delivery service. The MTA determines a sender associated with the first email message and determines a recipient for the first email message. The MTA identifies based upon the sender determined for the first email message, source internet protocol (IP) addresses comprising IP addresses usable as source IP addresses for the first email message. The MTA selects a particular source IP address from the source IP addresses and determines a destination IP address for the recipient of the email message. The MTA identifies, from a set of one or more proxy servers, a particular proxy server that is configured to handle the selected particular source IP address, establishes a connection to the proxy server and communicates to the particular proxy server, information including the particular source IP address and the destination IP address. The MTA transmits the first email message to the destination IP address using a connection established by the proxy server between the particular source IP address and the destination IP address.

In certain examples, determining a sender of the first email message comprises determining, by the MTA, a user associated with the sender of the first email message who is authorized to send the first email message, wherein the user associated with the sender is determined based at least in part on a "from" field of the first email message. In certain examples, the recipient for the first email message is determined based on the "to" field of the first email message.

In certain examples, the MTA selects the particular source IP address from the source IP addresses by determining a set of active source IP addresses from the source IP addresses and selects the particular source IP address from the set of active source IP addresses. In certain examples, the MTA uses a selection technique for selecting the particular source IP address from the set of active source IP addresses. In certain examples, the selection technique is a round-robin technique.

In certain examples, a first set of the source IP addresses for the sender is assigned to a first proxy server in the set of proxy servers and a second set of the source IP addresses for the sender is allocated to a second proxy server in the set of proxy servers. In certain examples, a first proxy server in the set of proxy servers is configured to handle a set of source IP addresses, wherein a first source IP address in the set is associated with a first sender and a second source IP address in the set is associated with a second sender. In certain examples, the first sender is different from the second sender.

In certain examples, the MTA identifies a subset of email messages from the email messages that are associated with the sender and transmits the subset of email messages to the destination IP address using the connection established by the proxy server between the particular source IP address and the destination IP address. In certain examples, the number of messages in the subset of messages is determined based on a message limit associated with a domain of the recipient, where the message limit specifies the number of messages that can be transmitted using the connection established by the proxy server.

In certain examples, the MTA receives a message from the proxy server indicating that the connection was successfully established by the proxy server between the particular source IP address and the destination IP address. In certain examples, the proxy server is a Transmission Control Protocol (TCP) proxy server. In certain examples, the MTA and the proxy server are implemented on a single computer system.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

DETAILED DESCRIPTION

Figure 1:
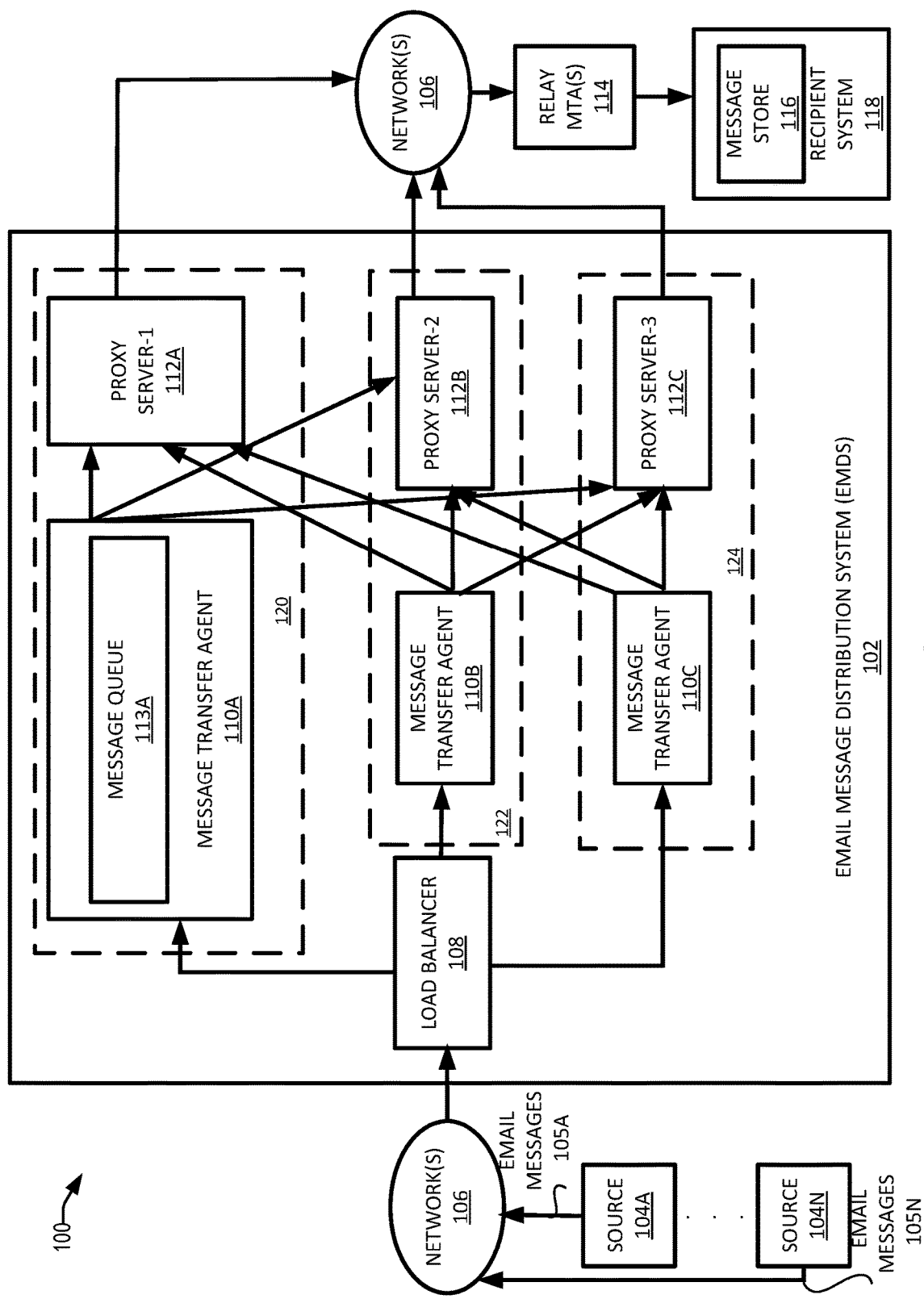
FIG. 1 depicts a computing environment that includes an email message delivery system (EMDS) that includes improved capabilities for efficiently processing and delivering email messages to a set of recipients, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs The present disclosure relates generally to cloud-based email delivery services. More specifically, but not by way of limitation, an improved architecture using Mail Transfer Agents (MTAs) and proxy servers is described that improves the scalability and reliability of the systems implementing the email delivery services.

Cloud-based email delivery services provide a fast and reliable managed solution for sending high-volume emails to be delivered to a set of intended recipients. A cloud-based email delivery service may be implemented using one or more cloud-based email delivery systems. A cloud-based email delivery system (EMDS) typically comprises a set of Message Submission Agents (MSAs) and Message Transfer Agents (MTAs) that are configured to receive email messages from various tenants or customers of the email delivery service and deliver the email messages to their intended recipients. As described herein, a customer or a tenant of the EMDS may represent one or more "senders" of an email message. Various email message delivery protocols may be used for communicating the email messages to their intended recipients. In one embodiment, a Simple Message Transfer Protocol (e.g., SMTP) is used to communicate the email messages to their intended recipients.

To process outbound message flows, an MSA in an email delivery system typically receives email messages from senders and routes the email messages to an MTA referred to as an "outbound MTA" since the email messages are sent outbound from the email delivery system. A selection technique is used to select an outbound MTA from among multiple available MTAs. In certain implementations, the outbound MTA may be randomly selected. In other implementations, a round-robin selection technique, a least recently used technique, or other more sophisticated selection techniques may be used. However, having separate MSA and MTA tiers typically results in inefficient use of resources for the email delivery service in terms of the additional hardware needed to implement such an architecture. Additionally, the use of more than one MTA tier requires the need to perform accurate routing of the messages to the MTA that has the correct set of IP addresses connected to it.

The email message delivery system described in the present disclosure provides several technical advancements and/or improvements over conventional cloud-based message delivery services. The email message delivery system described in this disclosure provides a fast and reliable managed email delivery service by implementing a robust infrastructure of network elements (e.g., MTAs and MSAs) that are configured to achieve greater operational efficiency and reduce the overall overhead of email processing. Instead of having two separate MSA and MTA tiers with each component in each tier requiring its own dedicated resources resulting in inefficient use of resources and more complex management of multiple email message queues, a new architecture is described that includes MTAs and proxy servers where the MTAs are configured to provide the combined functionality of conventional MSAs and MTAs.

In a certain implementation, the proxy server may be implemented as a Transmission Control Protocol (TCP) proxy server that acts an intermediary network entity between a source entity, e.g., the source MTA and a connection endpoint, where the connection endpoint is one that facilitates delivery of the email message to its intended recipient. To increase scalability and fault tolerance of the system, a pool of source IP addresses allocated to a particular sender may be spread across multiple proxy servers. In certain implementations, the IP addresses in the pool of source IP addresses for a particular sender may be broken down into non-overlapping ranges of addresses, and each range may be allocated to a separate proxy server thereby spreading the addresses across multiple proxy servers. This spreading out increases fault tolerance of the EMDS system—if a proxy server servicing IP addresses for a particular sender goes down, another one or more proxy servers are still available for servicing the sender and delivery of emails for that sender can continue. From the perspective of a proxy server, the source IP addresses assigned or allocated to that proxy server may be for only the sender or for multiple senders.

The new and improved architecture comprising MTAs and proxy servers additionally enables sharing of resources between the MTAs and the proxy servers resulting in more efficient use of resources. In certain implementations, both the MTA and the proxy server can share the same hardware resources. For instance, one or more MTAs and one or more proxy servers may be hosted and executed by the same computer system. The architecture described herein also simplifies recovery if a proxy server goes down. Firstly, the proxy server is a simple non-complex component (e.g., implemented using very few lines of code) thereby reducing its failure rate. However, if a proxy server does go down, the MTA just stops using that proxy server. The MTA may use and select source IP addresses allocated to other functioning proxy servers for sending the email messages. When a proxy server comes back up again or becomes operational again, the MTA may restart using source IP addresses allocated to that proxy server.

Instead of having to maintain multiple email message queues in the past with different queues for different senders, in the improved architecture described herein, an MTA can now maintain a single message queue that can contain email messages received from multiple different senders and directed to multiple different recipients. Thus, the MTA does not have to maintain separate message queues for different senders. Additionally, messages intended for various recipients now pass through a single MTA message queue. Accordingly, the number of message queues that an MTA has to maintain is reduced to a single message queue. This simplifies recovery procedures if an MTA goes down. When an MTA goes down or becomes inoperable, the email messages in the MTA's message queue in memory can be easily remounted onto a different MTA without having to worry about the specific email messages or senders of the email messages. Latency between the initial submission and the first delivery attempt is also significantly reduced because only one queue needs to be managed per MTA. This metric can be especially useful for financial services that may utilize an email delivery service to distribute buy or sell recommendations and that are particularly sensitive to latency.

Referring now to the drawings, FIG. 1 depicts a computing environment that includes an email message delivery system (EMDS) that includes improved capabilities for efficiently processing and delivering email messages to a set of recipients, according to certain embodiments. The EMDS 102 may be implemented by one or more computing systems that execute computer-readable instructions (e.g., code, program) to implement the EMDS 102. As depicted in FIG. 1, the EMDS 102 includes various systems and subsystems including a load balancer 108, a set of one or message transfer agents (MTAs) 110A, 110B and 110C and a set of one or more proxy servers 112A, 112B and 112C. The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The EMDS 102 may be implemented in various different configurations. In certain embodiments, the EMDS 102 may be implemented on one or more servers of a cloud provider network and its email message delivery services may be provided to subscribers of cloud services on a subscription basis. Computing environment 100 depicted in FIG. 1 is merely an example and is not intended to unduly limit the scope of claimed embodiments. One of ordinary skill in the art would recognize many possible variations, alternatives, and modifications. For example, in some implementations, the EMDS 102 can be implemented using more or fewer subsystems than those shown in FIG. 1, may combine two or more subsystems, or may have a different configuration or arrangement of subsystems.

In certain embodiments, the EMDS 102 provides a fast and reliable message delivery service for transmitting a high volume of email messages (also referred to herein as messages or emails) to a set of recipients. The email messages may be generated by various source(s) 104A-104N. A source (e.g., 104A) may represent a system of an entity such as a customer or tenant (e.g., an organization, an enterprise, or an individual) of the cloud provider who subscribes to the services provided by the EMDS 102 for processing and delivering email messages to a set of recipients. In certain examples, the EMDS 102 may receive email messages from the source(s) 104A-104N for delivery to a set of recipients. By way of example, the email messages 105A, from a source, 104A, may comprise a high volume (e.g., a billion) of solicited commercial emails (e.g., marketing emails, newsletters, coupons, invitations and the like) or transactional emails for delivery to a set of recipients. Each email message may be customized for delivery to a particular recipient in the set of recipients. As another example, the email messages from a source may comprise generic solicited commercial email messages sent by a user of the source for delivery to a set of recipients. As used herein, a user may refer to an end user, a business owner, or a marketing officer associated with a source (e.g., 104A) who interacts with the EMDS 102 to utilize the email delivery services provided by the EMDS 102.

In certain examples, a user associated with a source 104A may interact with the EMDS 102 using a user device that is communicatively coupled to the EMDS possibly via a public network 106 (e.g., the Internet). The user device may be of various types, including but not limited to, a mobile phone, a tablet, a desktop computer, and the like. For instance, a user may interact with the EMDS 102 using a user interface (UI) (which may be a graphical user interface (GUI)) of an application executed by the user device. The interaction may involve, for instance, setting up, by the user (e.g., an administrator of the organization), via the UI, various configuration parameters for enabling users of the organization to interact with the EMDS 102. For instance, the user may, via the UI, set up an approved sender list (by identifying the "From:" addresses of all the users sending email in its tenancy), request to create a pool of source IP addresses to be used to identify the users of its organization, set up a communication protocol (e.g., Simple Mail Transfer Protocol (SMTP)) and user credentials for its users to send email via the EMDS 102, specify a limit on the maximum number of outbound connections that can be concurrently supported by a source IP address (i.e., the maximum number of outbound connections that the IP address can have open to a single recipient domain at a time), specify a message limit on the number of messages that can be sent across a single connection to the recipient's domain and so on.

In certain examples, the number of IP addresses to add in a pool of IP addresses may directly correlate to the message sending volume requirements of an organization. An IP pool with a larger number of IP addresses can be created for an organization that typically sends out a large number of messages in a day. Additionally, connection limits specified by the recipient's domain which may be an email service (inbox) provider (e.g., Gmail®, Yahoo®, Microsoft® and so on) of the recipient of the message, may influence the number of IP addresses to be added to the pool. For example, the connection limit may specify a limit on the number of concurrent connections that a single source IP can have open to the recipient domain, specify a limit on the number of messages that can be sent across a single connection to the recipient domain and so on.

The creation of IP pools, by the EMDS 102, for an organization may also help protect the overall reputation of the organization and lead to improved message deliverability. An organization with a good sending reputation may require fewer IPs to deliver their mail as opposed to an organization that generates a lot of spam reports or has poor user engagement. In certain instances, an organization may wish to create separate IP pools. Using separate IP pools, an organization can send different kinds of emails (monthly newsletters, promotional emails or transactional emails) through separate sets of IP addresses. For example, an organization can use a "newsletter" pool for monthly newsletters and a "transactional" pool for emails. In this way, each pool of IPs can maintain their own reputation and do not get affected by the IPs in a different pool.

After configuring the EMDS 102 as described above, an end-user associated with a source (e.g., 104A) may, via the user device, send email message(s) to the EMDS 102 for delivery to a set of one or more recipients. In certain examples, the user may utilize an email client application (e.g., a mail user agent) installed in the device to compose an email message. The mail user agent (MUA) may format the email message in a suitable format prior to submission to the EMDS 102. In certain examples, the MUA may utilize a submission protocol (e.g., SMTP, HTTP, or other protocols) to transmit the message to the EMDS 102. In certain implementations, the email messages may be automatically sent to the EMDS via an application installed in the user's device.

In certain embodiments, a load balancer 108 within the EMDS 102 may be configured to receive email messages 105A-105N from the sources 104A-104N and select an MTA from a set of MTAs 110A-110N within the EMDS 102 for processing the email messages. As described herein, an MTA may be a network element (e.g., a mail server) within the EMDS 102 that is configured to receive email messages from the various sources and forward the email messages to the proper end-users or destination. In each MTA, the email messages received by the MTA for processing are queued in a message queue of the MTA. New email messages are typically added to the end or tail of the message queue and email messages are picked up for processing by the MTA from the start or head of the queue. In certain embodiments, the MTA may include a queue manager that is responsible for performing tasks related to managing the MTA message queue including performing tasks such as adding messages to the queue, selecting a message from the queue for processing, and the like. An MTA message queue may include email messages from multiple different senders and the email messages could be directed to different recipients.

Figure 2:
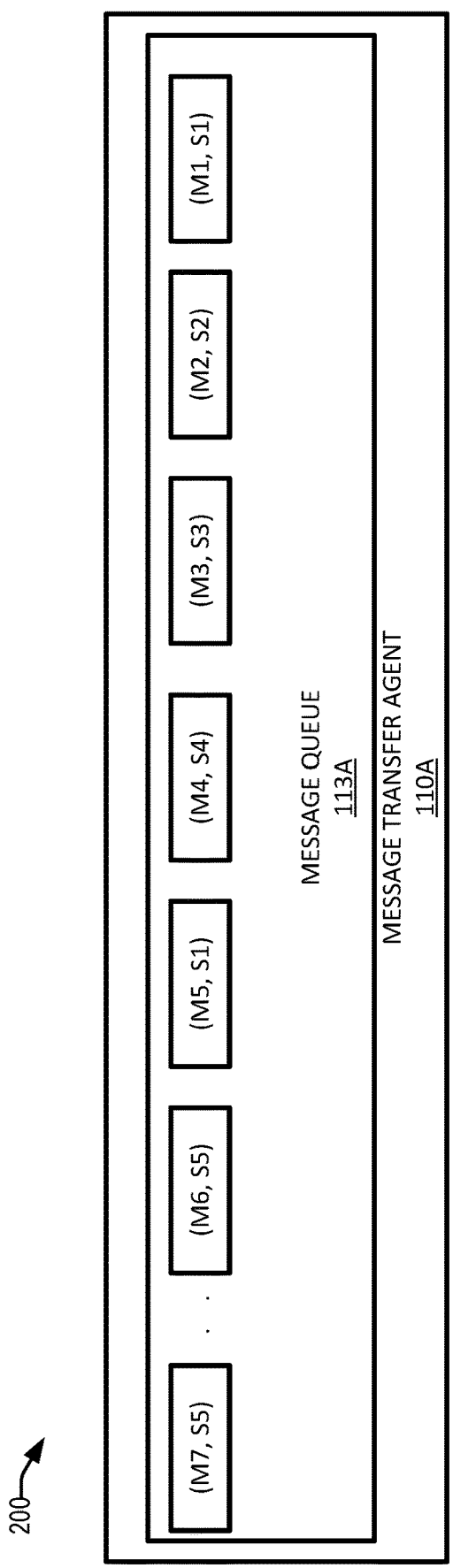
FIG. 2 is an exemplary illustration of the contents of a message queue within an MTA shown in FIG. 1, according to certain embodiments.

FIG. 2 is an exemplary illustration of the contents of a message queue within an MTA shown in FIG. 1, according to certain embodiments. The embodiment shown in FIG. 2 illustrates the contents of a message queue 113A in MTA 110A. Message queue 113A may store email messages from multiple senders and multiple email messages from the same sender. By way of example, message queue 113A may store email messages from multiple senders (M1, S1), (M2, S2), (M3, S3), (M4, S4), (M5, S1), (M6, S5), (M7, S5) and the email messages could be directed to different recipients.

Returning to the discussion of FIG. 1, in a certain implementation, each MTA (e.g., 110A, 110B or 110C) may include a Message Submission Agent (MSA) (not shown in FIG. 1) which may be a computer program or software agent implemented within the MTA that receives emails from a mail user agent (MUA) in the user's device and cooperates with the mail transfer agent (MTA) for delivery of the mail to the set of recipients. An MTA may also perform additional tasks. These tasks may include, but are not limited to, monitoring the flow of outgoing emails, delivering outgoing emails, queuing email messages, throttling, scheduling, connection management and tracking of email delivery status.

Various approaches may be used by the load balancer 108 to select an MTA from the set of MTAs 110A, 110B and 110C for processing email messages. For instance, in one approach, the load balancer 108 may select the MTAs using a round robin scheduling process to efficiently distribute the processing of email messages across each MTA in the set of MTAs. For instance, using round robin scheduling, the load balancer 108 may select a first MTA (e.g., 110A) in the set of MTAs to process and deliver a first batch of (e.g., the first 1000) messages received from the sources to a set of recipients, a second MTA (e.g., 110B) to process and deliver a second batch of (e.g., the second 1000) messages received from the sources to a set of recipients, and a third MTA (e.g., 110C) in the set of MTAs to process and deliver a third batch of (e.g., the third 1000) messages received from the sources to a set of recipients.

The selected MTA (e.g., 110A) receives the email messages and adds the messages to its message queue 113A for subsequent processing. When a certain number of messages (e.g., a batch of email messages) have been received and stored in the message queue 113A, the MTA begins processing the messages stored in its message queue 113A. The MTA periodically attempts to send all the messages stored in its message queue to the end-users (recipients) or destination until its message queue is empty. If a recipient's server does not respond, the MTA recurrently tries to send the email message to the recipient. If the email message fails to be delivered during a specific time period (e.g., a certain number of days) the MTA returns the email message to the host (sender of the message).

In certain embodiments, the processing of an email message by an MTA may involve, selecting, by the MTA, from its message queue, an email message for processing and determining, by the MTA, a sender and an intended recipient associated with the first email message. The MTA then identifies a pool of source IP addresses that are usable as source IP addresses for the email message based on the sender and selects a particular source IP address from the pool of source IP addresses. The MTA then identifies a particular proxy server from the set of proxy servers 112A-112C that is configured to handle the selected particular source IP address and communicates to the particular proxy server, information including the particular source IP address and the destination IP address. The MTA then transmits the email message to the destination IP address using a connection established by the proxy server between the particular source IP address and the destination IP address.

In a certain implementation, the pool of source IP addresses allocated to a sender may be spread across the set of proxy servers. One or more IP addresses from the pool may be assigned to a first proxy server in the set of proxy servers and a different set of IP addresses from the pool may be assigned to a second proxy server in the set of proxy servers. In certain examples, each proxy server in the set of proxy servers may be bound to a set of one or more source IP addresses, where a particular source IP address in the set of one or more source IP addresses may be associated with a particular sender. For instance, in the embodiment depicted in FIG. 1, a first proxy server 112A may be bound to set of source IP addresses where a first source IP address in the set may be associated with a first sender and a second source IP address in the set may be associated with a second sender, and the first sender may be different from the second sender. In certain examples, the allocation of IP addresses associated with a sender to the different proxy servers may be performed by an administrator of the EMDS when the sender subscribes to the services provided by the EMDS. Details related to the processing performed by the MTA and the proxy servers for processing and delivering email messages to a set of one or more recipients is described below with respect to the flowcharts depicted in FIG. 2 and FIG. 3 and their accompanying description.

The computing environment 100 additionally comprises one or more relay MTAs 114 and a recipient system 118. The relay MTAs 114 and the recipient system 118 may be communicatively coupled to the EMDS 102 via one or more communication networks 106 (e.g., the Internet). In certain instances, email messages may be relayed, that is, forwarded by the source MTA (e.g., 110A) to another MTA (also referred to herein as a relay MTA, which may not be implemented within the EMDS) before it is delivered to its intended recipient. When a relay MTA 114 receives an email message, it adds a received trace header field to the top of the header of the message, thereby building a sequential record of MTAs handling the message. A selection of a relay MTA for the next hop (route) may be determined as part of configuring the MTAs for processing email messages by an administrator of the EMDS 102. Once the relay MTA 114 accepts the message, it can either deliver the message to a user on its system, or it may pass the message along to another relay MTA identified in the route. Ultimately, a message arrives at the MTA that is the final destination. If the message is destined for a user on a system, the MTA passes it to a recipient system 118 for its final delivery. The recipient system 118 may represent an email service (inbox) provider (e.g., Gmail®, Yahoo®, Microsoft® and so on) of the recipient of the email message. The recipient system 118 may store the message in a message store 116 until the intended recipient is ready to pick it up. The recipient may use an MUA on the recipient's device to contact the recipient system 118 and retrieve the message from the message store. After the recipient system successfully authenticates the requester, it transfers that user's messages to the user's MUA. In certain examples, the recipient may be an end-user receiving legitimate solicited commercial email messages (e.g., email messages comprising advertisements, sales content and the like) from the various sources 104A-104N.

Figure 3:
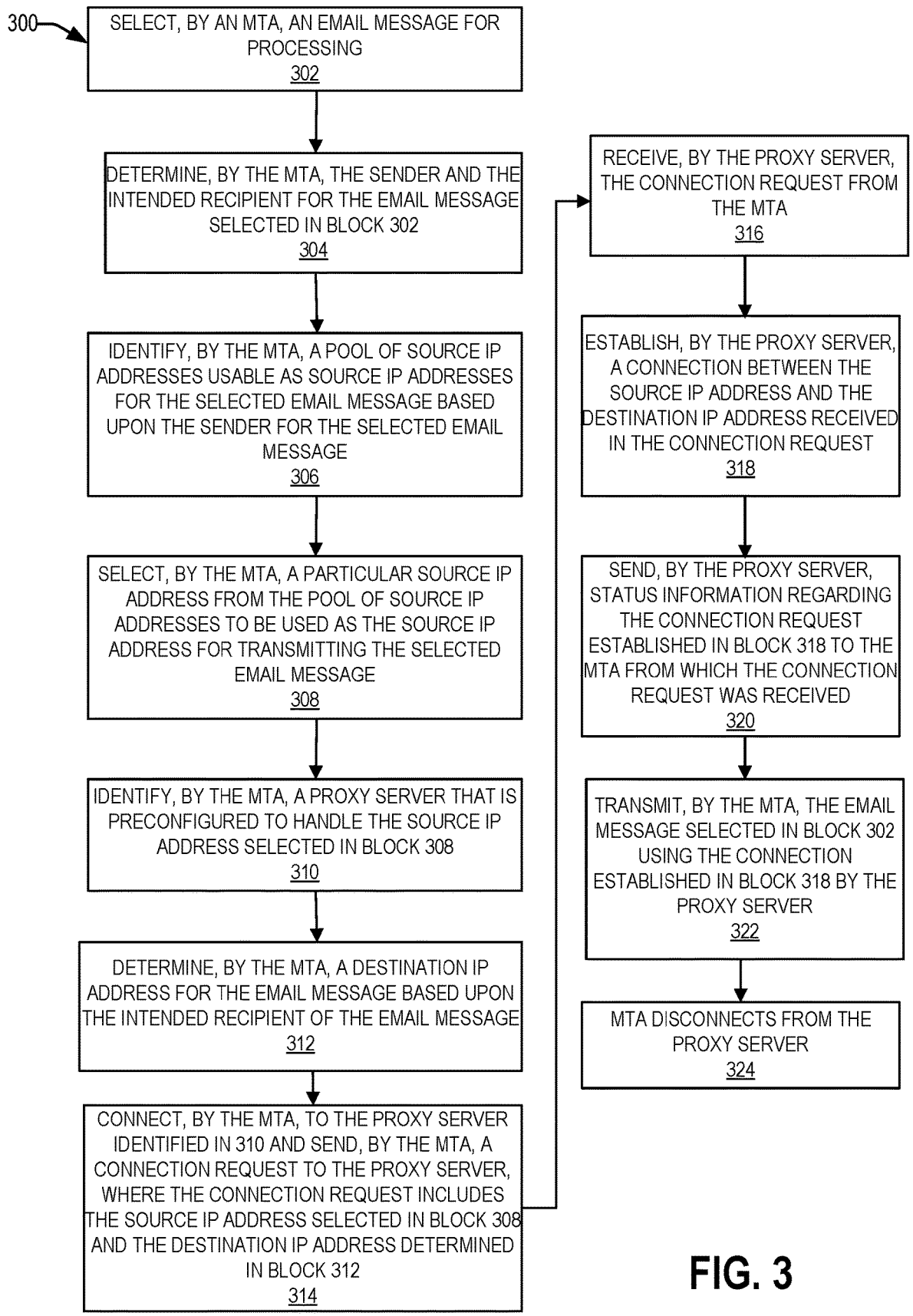
FIG. 3 depicts an example of a process performed by an MTA in cooperation with a proxy server for processing email messages received by an EMDS and which are to be delivered to their intended recipients, according to certain embodiments.

FIG. 3 depicts an example of a process 300 performed by an MTA in cooperation with a proxy server for processing email messages received by an EMDS and which are to be delivered to their intended recipients, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by components of EMDS 102, such as by an MTA (e.g., MTA 110A) and a proxy (e.g., proxy 112A).

The processing depicted in FIG. 3 assumes that an EMDS has received a set of email messages that are to be delivered to their intended recipients. The email messages may be received from one or more different customers (i.e., senders) or subscribers of the email delivery service provided by the EMDS. The received email messages are then forwarded to one or more MTAs of the EMDS for processing. In each MTA, the email messages received by the MTA for processing are queued in a message queue of the MTA. As previously described, an MTA message queue may include email messages from multiple different senders and the email messages could be directed to different recipients.

For example, in the embodiment depicted in FIG. 1, EMDS 102 may receive email messages from multiple senders. Within EMDS 102, load balancer 108 may be used to distribute the email messages to the different MTAs 110A, 110B, and 110C and the email messages may be queued in the messages queues of the individual MTAs. For example, in FIG. 1, email messages received by MTA 110A for processing may be queued in message queue 113A of MTA 110A.

The processing depicted in FIG. 3 may be initiated when, at block 302, an email message is selected from the head of the message queue for processing by an MTA. For example, in FIG. 1, MTA 110A may select an email message at the head of message queue 113A for processing.

At block 304, for the email message selected in 302, the MTA determines the sender and the intended recipient for the selected email message. For example, in FIG. 1, MTA 110A may determine the sender and intended recipient for an email message selected for processing from message queue 113A.

Each email message contains multiple fields, such as a "FROM" field that identifies a user associated with a sender of the email message, a "TO" field that identifies the intended recipient of the email message, a "BODY" field that contains the contents of the email, and the like. As part of the processing in 304, the MTA may parse the selected email message to determine a user for the email message from the "FROM" field of the email message and an intended recipient of the email message from the "TO" field. In certain implementations, the MTA may parse the string in the "FROM" field to determine the user associated with the sender who is authorized to send the email message. For example, the "FROM" field may contain a string in the format: "user1@abccompany.com". Here, "user1" may identify a user associated with the sender of the email message. The portion of the string after the "@" symbol identifies a domain name or a fully qualified domain name associated with the sender. MTA may identify the sender for the email message based upon the domain name. For the user1@abccompany.com example, the sender may be identified as ABC Company.

In certain examples, after determining the sender for the email message, the MTA may initiate authorization processing based on prior authentication to determine a list of all possible FROM addresses that the sender is authorized to use. The MTA then checks the messages from the sender to make sure they have used authorized FROM addresses. In certain embodiments, a check may also be made to see if the sender is authorized to send email messages to the domain corresponding to the "TO" field of the email message.

At block 306, based upon the sender for the message selected in 304, the MTA identifies a pool of source IP addresses, where the pool contains IP addresses that can be used as the source IP address for the email message. In certain examples, the pool of source IP addresses for a sender and for users associated with that sender may be pre-allocated by the EMDS. For example, this may be done when the sender subscribes to the email delivery service and provides a list of authorized users to the EMDS.

In certain implementations, the sender may identify a particular pool of source IP addresses. For example, in FIG. 1, MTA 110A may, based upon the sender determined for the email message in 304, identify a pool of source IP addresses. In other embodiments, the sender determined for the email message may be used to identify a pool of source IP addresses. In certain implementations, a pool of source IP addresses may be shared between senders.

At block 308, the MTA selects, from the pool of source IP addresses identified in block 306, a particular source IP address to be used as the source IP address for transmitting the email message selected in 302. The MTA may use various selection techniques to select a particular source IP address from the pool of source IP addresses. In certain implementations, the MTA may first determine a set of active IP addresses from the pool of IP addresses, where an IP address is considered as active if the IP address has not expired and is still working. The active IP addresses represent source IP addresses that are still usable for sending emails. For example, an IP address in the pool of IP addresses determined in 306 may not be active or usable because the source IP address has passed its connection rate limit for the particular recipient of the email message, a proxy server servicing that IP address is marked as failed or inactive, delivery of email messages using that IP address have failed in the past, and the like. As part of the processing in 308, the MTA may filter out those addresses from the pool of addresses determined in 306 that are not active.

After an active set of IP addresses has been identified, the MTA may then use a selection technique to select a single source IP address from the set of active addresses. In certain implementations, the selection technique may involve randomly selecting an IP address from the set of active IP addresses. In some other embodiments, a round-robin selection technique or a least-recently used technique may be used to select a single IP address from the set of active addresses. In yet other implementations, the single address may be selected based upon reputations associated with the set of active addresses. For example, the IP address with the highest reputation may be selected. For example, in the embodiment depicted in FIG. 1, MTA 110A may identify a set of active source IP addresses and then select a single source IP address from the set using, for example, a round-robin selection scheme (or some other selection technique).

At block 310, the MTA identifies a proxy server that is preconfigured to handle the source IP address selected in block 308. In a typical scenario, the proxy server may be selected from among multiple proxy servers based upon the source IP address. In a certain implementation, the proxy server may be implemented as a TCP proxy server that acts an intermediary network entity between a source entity, e.g., the source MTA and a connection endpoint, where the connection endpoint is one that facilitates delivery of the email message to its intended recipient.

In certain implementations, the source IP addresses managed by the EMDS for the various senders may be pre-assigned or pre-allocated to a set of MTAs. For example, in FIG. 1, the source IP addresses handled by EMDS 102 may be allocated among proxy servers 112A, 112B, and 112C. To increase scalability and fault tolerance of the system, the pool of source IP addresses for a particular sender may be spread across multiple proxy servers. In certain implementations, the IP addresses in the pool of source IP addresses for a particular sender may be broken down into non-overlapping ranges of addresses, and each range may be allocated to a separate proxy server thereby spreading the addresses across multiple proxy servers. This spreading out increases fault tolerance of the EMDS system—if a proxy server servicing IP addresses for a particular sender goes down, other one or more proxy servers are still available for servicing the sender and delivery of emails for that sender can continue. From the perspective of a proxy server, the source IP addresses assigned or allocated to that proxy server may be for only the sender or for multiple senders.

For example, in FIG. 1, as part of the processing in 310, MTA 110A may determine that the source IP address selected in 308 maps to or is allocated to proxy server-1 112A. MTA 110A may accordingly select proxy server-1 112A in 310. The selected proxy server may be executing on the same computer machine that executes the MTA or on some other computer system.

At 312, the MTA determines a destination IP address for the email message to be sent based upon the intended recipient of the email message identified in 304. The destination IP address determined in 312, corresponds to the IP address of a network endpoint to which the email message is to be sent to facilitate communication of the email message to its intended recipient. For example, as described above, the intended recipient for an email message may be identified in the "TO" field of the email message. For example, the "TO" field may comprise a string of the form "recipient@xyz.com," where "recipient" identifies a user name and "xyz.com" identifies a domain name. The domain name "xyz.com" itself comprises a first part "xyz" identifying an organization and a second part ".com" identifying a top level domain (TLD) (TLD can be .com, .org, .edu, .net, .gov, etc.). As part of the processing in 312, the MTA may determine the destination IP address to which the email message is to be sent based upon the user name and domain for the intended recipient of the email message. For example, the MTA may resolve a domain name to determine the fully qualified domain name of a mail exchange server in the Domain Name System (DNS). The DNS server for the domain responds with any Mail Exchange (MX) records listing the mail exchange servers for that domain, for example, a relay MTA (e.g, 114) run by the recipient's ISP. The IP address of that relay MTA is determined as the destination IP address in 312.

At block 314, the MTA connects to the proxy server and then sends a connection request to the proxy server identified in 310, where the connection request includes the source IP address selected in 308 and the destination IP address determined in 312. The connection request may also include an instruction requesting the proxy server to set up a connection between the source IP address and the destination IP address.

At block 316, the proxy server receives the connection request from the MTA. For example, in FIG. 1, proxy server-1 112A may receive the connection request from MTA 110A.

At block 318, the proxy sever establishes a connection between the source IP address received in the connection request and the destination IP address received in the connection request. For example, in FIG. 1, proxy server-1 112A may determine the source and destination IP addresses received in the connection request and establish a connection between the source IP address and the destination IP address.

At 320, the proxy server may send status information regarding the connection established in 318 to the MTA from which the connection request was received. For example, in FIG. 1, proxy server-1 112A may send status information to MTA 110A. The status may indicate either success or failure in setting up the connection. If a failure, then the MTA and the proxy server may take some error correction steps.

At block 322, the MTA transmits the email message selected in 302 using the connection established in 318 by the proxy server. The email is sent such that the source IP address of the email is the source of the email and the email is sent to the destination IP address, where the destination IP address is of an endpoint (e.g., a relay MTA) that facilitates communication of the email message to its intended recipient. For example, in FIG. 1, the MTA 110A may send the selected email message to a relay MTA 114 via a connection established by proxy server-1 112A. In certain implementations, the email message may be transmitted using the Simple Mail Transfer Protocol (SMTP). The relay MTA receiving the email message on a remote system operating outside the control of the EMDS may forward the message to a message store (e.g., message store 116 in FIG. 1) associated with the intended recipient, or may forward it to another intermediate network entity such as another relay MTA. In this manner, the email message is communicated via one or more relay MTAs to the message store of the intended recipient. The message store may be, for example, an inbox associated with the intended recipient of the email message.

In certain embodiments, in 322, the MTA may transmit multiple email messages via the connections established by the proxy server. These email messages may include, for example, email messages from the same sender and directed to the same recipient. In some other embodiments, these multiple email messages may include email messages from the same sender and directed to the same domain (e.g., "xyz.com") and possibly to different recipients at that common domain. In certain embodiments, the MTA may examine the email messages in its message queue to determine if multiple email messages can be sent via the connection established by the proxy server. The MTA may identify these multiple email messages and remove them from the message queue and form a job, where the job contains multiple email messages. The email messages in the job may then be transmitted in 322 using the connection established by the proxy server in 318.

In certain examples, the number of messages that can be added to a job may be determined based at least in part on a message limit on the number of messages that can be sent across a single connection to the recipient's domain. The MTA then pulls the messages from the queue in an order in which they were received in the queue and transmits the multiple messages to the recipient using the connection established by the proxy server for the MTA. After sending a certain number of messages across the connection, in certain embodiments, at block 324, the MTA may disconnect from the proxy server and the proxy server may disconnect from the remote system.

In certain implementations, the MTA is also configured to handle error conditions where the proxy server is unable to establish a connection between a source IP address and a destination IP address. According to one error handling technique, after a certain number of connection establishment retries by the proxy server, the proxy server may return an error code to the MTA in block 318 that a connection could not be established. The MTA may then select a different source IP address for the email message and request the proxy server to establish a connection between the new source IP address and the destination IP address corresponding to the recipient.

In yet other situations, after the MTA has transmitted the email message in 322, the MTA may receive an error code indicating that the email message could not be delivered to the intended recipient. This may be because of a problem with the destination IP address, a network problem, due to a problem with the reputation associated with the source IP address used for sending the email message and the email message being rejected by the recipient's email system, the source IP address used for sending the email message has passed its connection rate limit for the particular recipient system (inbox provider), a proxy server connection on that source IP address has failed, the recipient is no longer able to receive email on that source IP, or some other reason. The connection rate limit specifies the maximum number of concurrent connections that can be made using a source IP address to the mailbox provider of a recipient's system. In such a situation, the EMDS may use various retry techniques. For example, according to one technique, the particular email message that could not be successfully sent is inserted back in the message queue or a retry queue. When the email message is selected from the queue for sending, a new source IP address is selected for the email message that is different from the previously selected source IP address. The email message is then sent using the new source IP address.

In certain embodiments, the MTA-proxy server architecture described in this disclosure provides for greater operational efficiency and efficient resource management. In certain implementations, both the MTA and the proxy server can share the same hardware resources. For instance, one or more MTAs and one or more proxy servers may be hosted and executed by the same computer system. For example, in the embodiment depicted in FIG. 1, MTA 110A and proxy server-1 112A are hosted and executed by the same computing system 120. The resources of computer system 120, such as memory resources, processing resources, and network resources, may be shared by MTA 110A and proxy server-1 112A. Likewise, MTA 110B and proxy server-2 112B are on the same computer system 122 and MTA 110C and proxy server-3 1112C are on computer system 124. The configuration depicted in FIG. 1 is merely an example and is not intended to unduly limit the scope of claimed embodiments. One of ordinary skill in the art would recognize many possible variations, alternatives, and modifications. For example, other implementations are possible where multiple proxy servers are executed by the same computer system, multiple MTAs are executed by the same computer system, each of the MTAs and the proxy servers are implemented on separate computer systems, and the like.

In the embodiments disclosed herein, the message queue maintained by an MTA can contain email messages from different senders and directed to different recipients. The MTA does not have to maintain separate message queues for different senders. Additionally, messages indented for various recipients now pass through a single MTA message queue. Accordingly, the number of message queues that an MTA has to maintain is reduced to a single message queue. This simplifies recovery procedures if an MTA goes down. When an MTA goes down or becomes inoperable, the email messages in the MTA's message queue in memory can be easily remounted onto a different MTA without having to worry about the specific email messages or senders of the email messages.

The architecture embodiments described herein also simplify recovery if a proxy server goes down. Firstly, the proxy server is a simple non-complex component (e.g., very few lines of code) thereby reducing its failure rate. However, if a proxy server does go down, the MTA just stops using that proxy server. The MTA may stop using source IP addresses that are allocated to that proxy server. For example, as part of the processing in 308 in FIG. 3, the MTA may filter out source IP addresses that are allocated to a proxy server that are down or that are tagged as non-functioning or non-operational by the MTA. The MTA may use and select source IP addresses allocated to other functioning proxy servers for sending the email messages. When a proxy server comes back up again or becomes operational again, the MTA may restart using source IP addresses allocated to that proxy server.

Example Architectures

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 4:
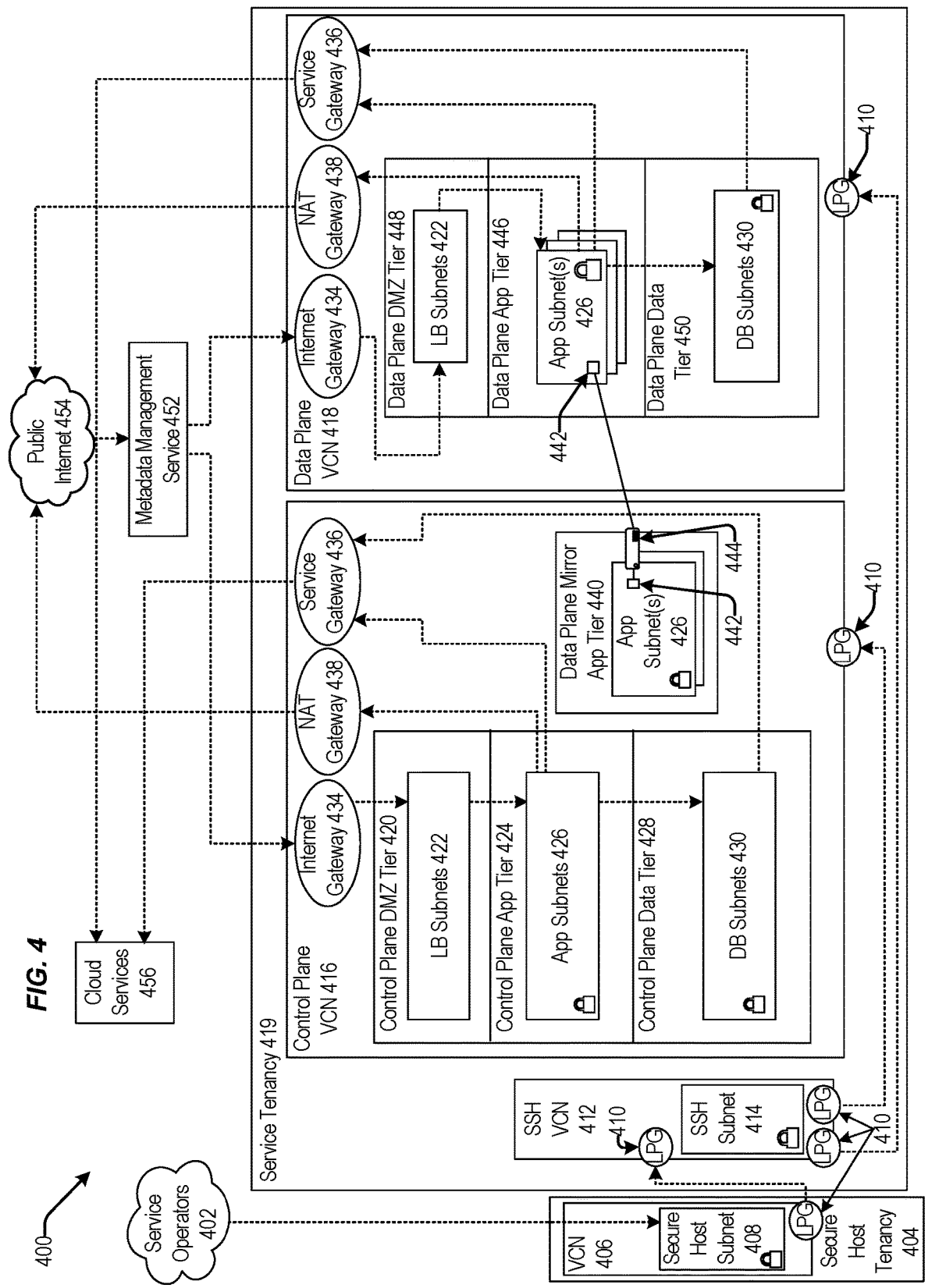
FIG. 4 is a block diagram illustrating one pattern for implementing a cloud infrastructure as a service system, according to at least one embodiment.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Memory that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
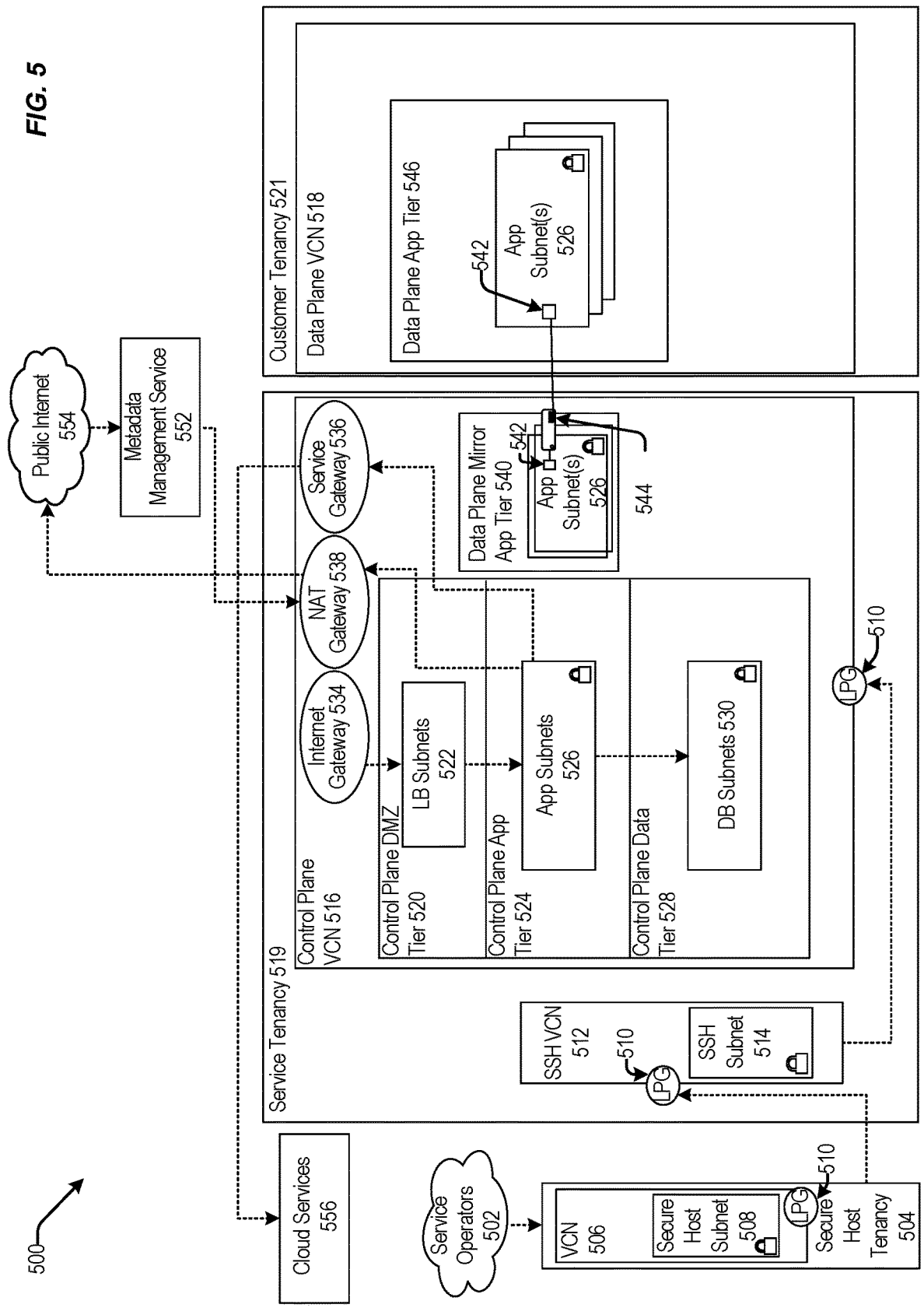
FIG. 5 is a block diagram illustrating another pattern for implementing a cloud infrastructure as a service system, according to at least one embodiment.

FIG. 5 is a block diagram 500 illustrating another example pattern of an IaaS architecture, according to at least one embodiment. Service operators 502 (e.g. service operators 402 of FIG. 4) can be communicatively coupled to a secure host tenancy 504 (e.g. the secure host tenancy 404 of FIG. 4) that can include a virtual cloud network (VCN) 506 (e.g. the VCN 406 of FIG. 4) and a secure host subnet 508 (e.g. the secure host subnet 408 of FIG. 4). The VCN 506 can include a local peering gateway (LPG) 510 (e.g. the LPG 410 of FIG. 4) that can be communicatively coupled to a secure shell (SSH) VCN 512 (e.g. the SSH VCN 412 of FIG. 4) via an LPG 410 contained in the SSH VCN 512. The SSH VCN 512 can include an SSH subnet 514 (e.g. the SSH subnet 414 of FIG. 4), and the SSH VCN 512 can be communicatively coupled to a control plane VCN 516 (e.g. the control plane VCN 416 of FIG. 4) via an LPG 510 contained in the control plane VCN 516. The control plane VCN 516 can be contained in a service tenancy 519 (e.g. the service tenancy 419 of FIG. 4), and the data plane VCN 518 (e.g. the data plane VCN 418 of FIG. 4) can be contained in a customer tenancy 521 that may be owned or operated by users, or customers, of the system.

The control plane VCN 516 can include a control plane DMZ tier 520 (e.g. the control plane DMZ tier 420 of FIG. 4) that can include LB subnet(s) 522 (e.g. LB subnet(s) 422 of FIG. 4), a control plane app tier 524 (e.g. the control plane app tier 424 of FIG. 4) that can include app subnet(s) 526 (e.g. app subnet(s) 426 of FIG. 4), a control plane data tier 528 (e.g. the control plane data tier 428 of FIG. 4) that can include database (DB) subnet(s) 530 (e.g. similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g. the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g. the service gateway of FIG. 4) and a network address translation (NAT) gateway 538 (e.g. the NAT gateway 438 of FIG. 4). The control plane VCN 516 can include the service gateway 536 and the NAT gateway 538.

The control plane VCN 516 can include a data plane mirror app tier 540 (e.g. the data plane mirror app tier 440 of FIG. 4) that can include app subnet(s) 526. The app subnet(s) 526 contained in the data plane mirror app tier 540 can include a virtual network interface controller (VNIC) 542 (e.g. the VNIC of 442) that can execute a compute instance 544 (e.g. similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g. the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g. the metadata management service 452 of FIG. 4) that can be communicatively coupled to public Internet 554 (e.g. public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g. cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

Figure 6:
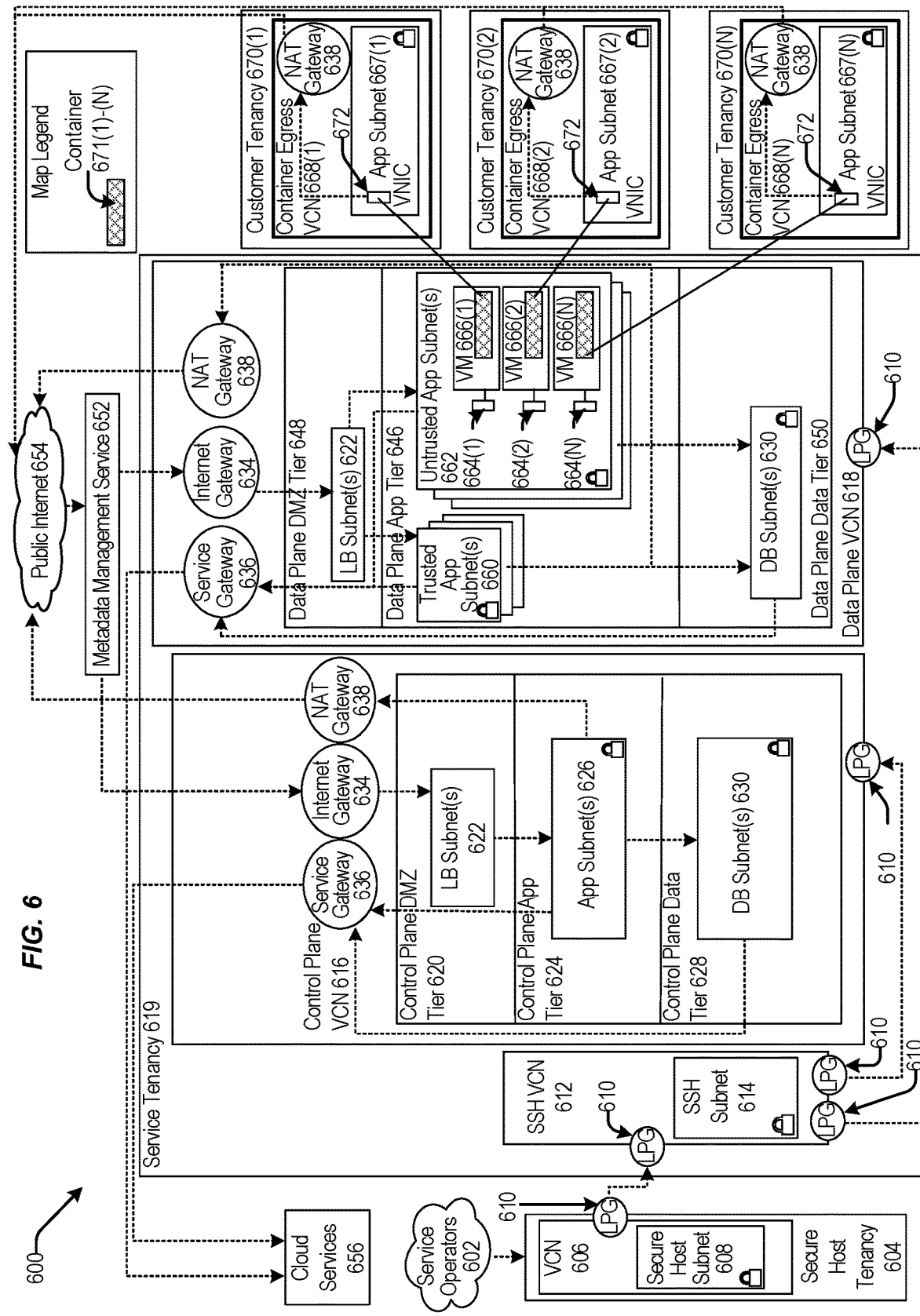
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 402 of FIG. 4) can be communicatively coupled to a secure host tenancy 604 (e.g. the secure host tenancy 404 of FIG. 4) that can include a virtual cloud network (VCN) 606 (e.g. the VCN 406 of FIG. 4) and a secure host subnet 608 (e.g. the secure host subnet 408 of FIG. 4). The VCN 606 can include an LPG 610 (e.g. the LPG 410 of FIG. 4) that can be communicatively coupled to an SSH VCN 612 (e.g. the SSH VCN 412 of FIG. 4) via an LPG 610 contained in the SSH VCN 612. The SSH VCN 612 can include an SSH subnet 614 (e.g. the SSH subnet 414 of FIG. 4), and the SSH VCN 612 can be communicatively coupled to a control plane VCN 616 (e.g. the control plane VCN 416 of FIG. 4) via an LPG 610 contained in the control plane VCN 616 and to a data plane VCN 618 (e.g. the data plane 418 of FIG. 4) via an LPG 610 contained in the data plane VCN 618. The control plane VCN 616 and the data plane VCN 618 can be contained in a service tenancy 619 (e.g. the service tenancy 419 of FIG. 4).

The control plane VCN 616 can include a control plane DMZ tier 620 (e.g. the control plane DMZ tier 420 of FIG. 4) that can include load balancer (LB) subnet(s) 622 (e.g. LB subnet(s) 422 of FIG. 4), a control plane app tier 624 (e.g. the control plane app tier 424 of FIG. 4) that can include app subnet(s) 626 (e.g. similar to app subnet(s) 426 of FIG. 4), a control plane data tier 628 (e.g. the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g. the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g. the service gateway of FIG. 4) and a network address translation (NAT) gateway 638 (e.g. the NAT gateway 438 of FIG. 4). The control plane VCN 616 can include the service gateway 636 and the NAT gateway 638.

The data plane VCN 618 can include a data plane app tier 646 (e.g. the data plane app tier 446 of FIG. 4), a data plane DMZ tier 648 (e.g. the data plane DMZ tier 448 of FIG. 4), and a data plane data tier 650 (e.g. the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g. public Internet 454 of FIG. 4).

The Internet gateway 634 contained in the control plane VCN 616 and contained in the data plane VCN 618 can be communicatively coupled to a metadata management service 652 (e.g. the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
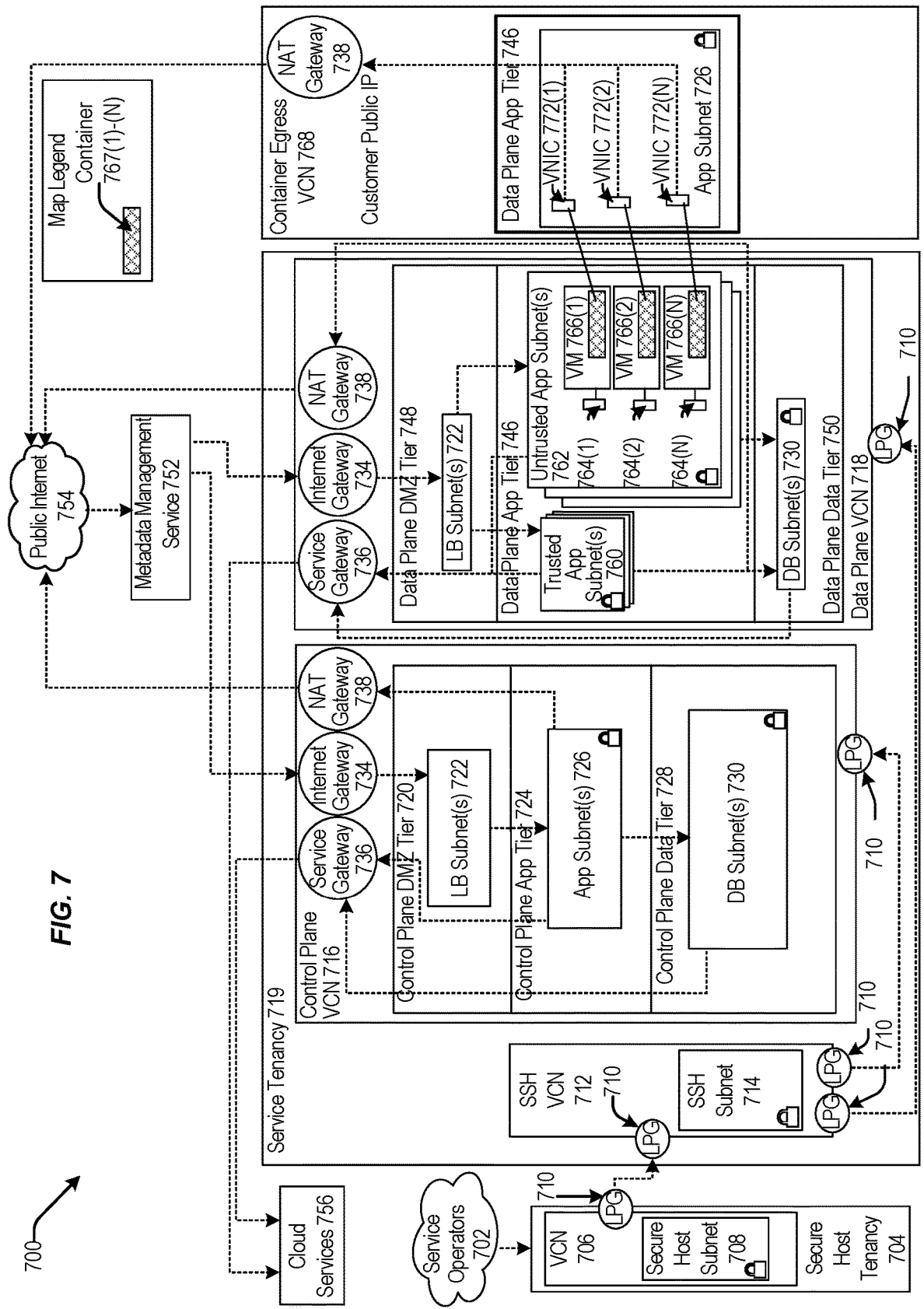
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 402 of FIG. 4) can be communicatively coupled to a secure host tenancy 704 (e.g. the secure host tenancy 404 of FIG. 4) that can include a virtual cloud network (VCN) 706 (e.g. the VCN 406 of FIG. 4) and a secure host subnet 708 (e.g. the secure host subnet 408 of FIG. 4). The VCN 706 can include an LPG 710 (e.g. the LPG 410 of FIG. 4) that can be communicatively coupled to an SSH VCN 712 (e.g. the SSH VCN 412 of FIG. 4) via an LPG 710 contained in the SSH VCN 712. The SSH VCN 712 can include an SSH subnet 714 (e.g. the SSH subnet 414 of FIG. 4), and the SSH VCN 712 can be communicatively coupled to a control plane VCN 716 (e.g. the control plane VCN 416 of FIG. 4) via an LPG 710 contained in the control plane VCN 716 and to a data plane VCN 718 (e.g. the data plane 418 of FIG. 4) via an LPG 710 contained in the data plane VCN 718. The control plane VCN 716 and the data plane VCN 718 can be contained in a service tenancy 719 (e.g. the service tenancy 419 of FIG. 4).

The control plane VCN 716 can include a control plane DMZ tier 720 (e.g. the control plane DMZ tier 420 of FIG. 4) that can include LB subnet(s) 722 (e.g. LB subnet(s) 422 of FIG. 4), a control plane app tier 724 (e.g. the control plane app tier 424 of FIG. 4) that can include app subnet(s) 726 (e.g. app subnet(s) 426 of FIG. 4), a control plane data tier 728 (e.g. the control plane data tier 428 of FIG. 4) that can include DB subnet(s) 730 (e.g. DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g. the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 4) and a network address translation (NAT) gateway 738 (e.g. the NAT gateway 438 of FIG. 4). The control plane VCN 716 can include the service gateway 736 and the NAT gateway 738.

The data plane VCN 718 can include a data plane app tier 746 (e.g. the data plane app tier 446 of FIG. 4), a data plane DMZ tier 748 (e.g. the data plane DMZ tier 448 of FIG. 4), and a data plane data tier 750 (e.g. the data plane data tier 450 of FIG. 4). The data plane DMZ tier 748 can include LB subnet(s) 722 that can be communicatively coupled to trusted app subnet(s) 760 (e.g. trusted app subnet(s) 660 of FIG. 6) and untrusted app subnet(s) 762 (e.g. untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g. public Internet 454 of FIG. 4).

The Internet gateway 734 contained in the control plane VCN 716 and contained in the data plane VCN 718 can be communicatively coupled to a metadata management service 752 (e.g. the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
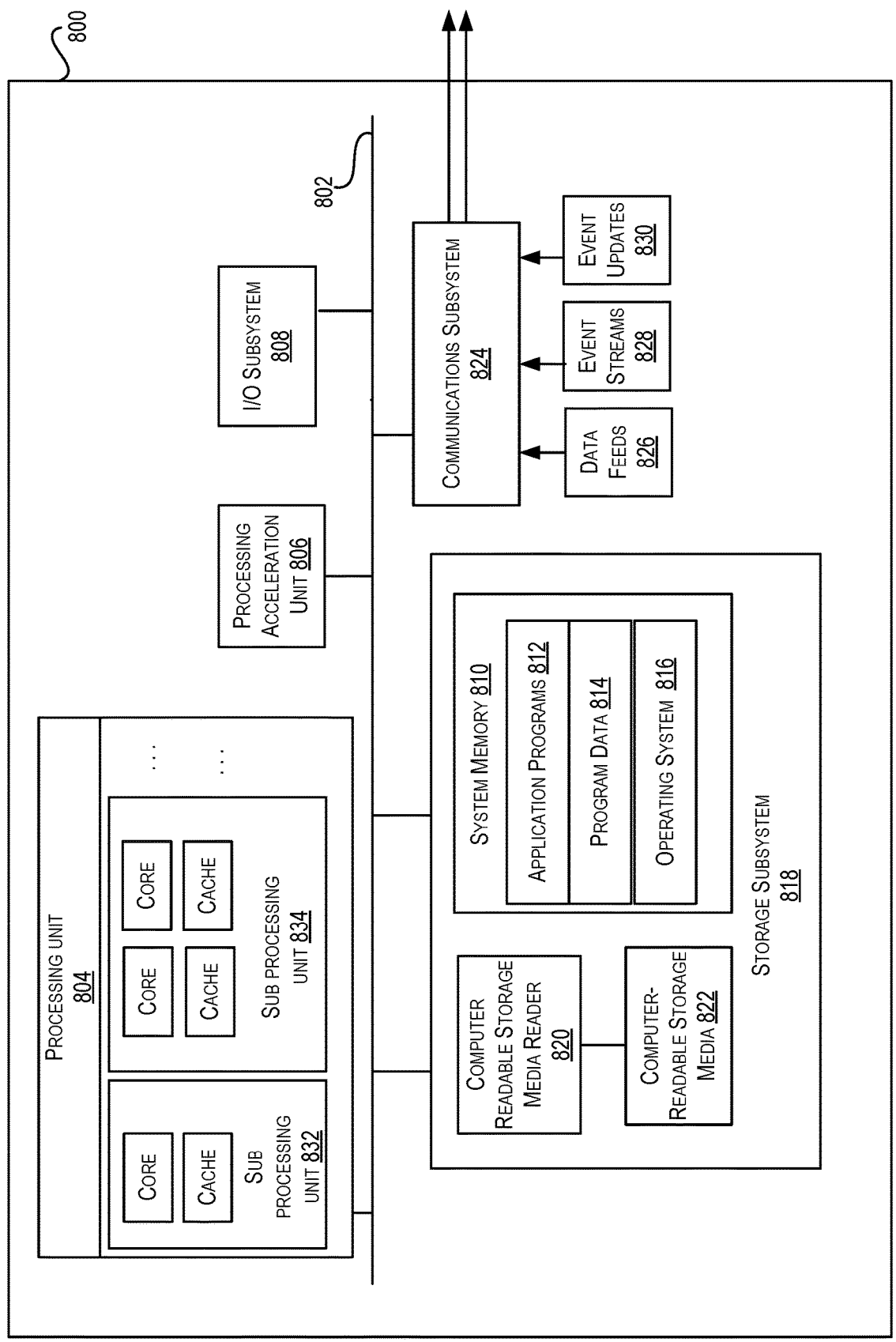
FIG. 8 illustrates an example computer system, in which various embodiments may be implemented.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
executing, by an email message delivery system providing an email delivery service, a message transfer agent (MTA) and a proxy server;
selecting, by the MTA, from a message queue, a first email message for processing, wherein the message queue comprises a plurality of email messages received from a plurality of senders;
identifying, by the MTA and based upon a sender determined for the first email message, a plurality of source internet protocol (IP) addresses comprising IP addresses usable as source IP addresses for the first email message;
selecting, by the MTA, a particular source IP address from the plurality of source IP addresses;
determining, by the MTA, a destination IP address for a recipient of the email message;
identifying, by the MTA and from a set of one or more proxy servers, a first proxy server that is configured to handle the selected particular source IP address, wherein a first set of the plurality of source IP addresses for the sender is assigned to the first proxy server in the set of proxy servers;
communicating, by the MTA and to the first proxy server, information including the particular source IP address and the destination IP address; and
transmitting, by the MTA, the first email message to the destination IP address using a connection established by the first proxy server between the particular source IP address and the destination IP address.

2. The method of claim 1 wherein determining, by the MTA, the sender of the first email message comprises determining, by the MTA, a user associated with the sender of the first email message who is authorized to send the first email message, wherein the user associated with the sender is determined based at least in part on a "from" field of the first email message.

3. The method of claim 1, wherein the recipient of the first email message is determined based at least in part on the "to" field of the first email message.

4. The method of claim 1, wherein selecting, by the MTA, the particular source IP address from the plurality of source IP addresses comprises determining, by the MTA, a set of active source IP addresses from the plurality of source IP addresses and selecting the particular source IP address from the set of active source IP addresses.

5. The method of claim 4, further comprising, using by the MTA, a selection technique for selecting the particular source IP address from the set of active source IP addresses.

6. The method of claim 1, wherein a second set of the plurality of source IP addresses for the sender is allocated to a second proxy server in the set of proxy servers.

7. The method of claim 1, wherein the first proxy server in the set of proxy servers is configured to handle a set of source IP addresses, wherein a first source IP address in the set is associated with a first sender of the plurality of senders and a second source IP address in the set is associated with a second sender of the plurality of senders, wherein the first sender is different from the second sender.

8. The method of claim 1, further comprising:
identifying, by the MTA, a subset of email messages from the plurality of email messages that are associated with the sender; and
transmitting, by the MTA, the subset of email messages to the destination IP address using the connection established by the proxy server between the particular source IP address and the destination IP address.

9. The method of claim 8, wherein the number of messages in the subset of messages is determined based at least in part on a message limit associated with a domain of the recipient, wherein the message limit specifies the number of messages that can be transmitted using the connection established by the proxy server.

10. The method of claim 1, wherein transmitting, by the MTA, the first email message to the destination IP address comprises receiving, from the proxy server, a message indicating that the connection was successfully established by the proxy server between the particular source IP address and the destination IP address.

11. The method of claim 1, wherein the proxy server is a Transmission Control Protocol (TCP) proxy server.

12. The method of claim 1, wherein the MTA and the proxy server are implemented on a single computer system.

13. An email delivery system providing an email delivery service comprising:
a memory; and
one or more processors configured to perform processing, the processing comprising:
executing, by the email delivery system, a message transfer agent (MTA) and a proxy server;
selecting, by the MTA, from a message queue, a first email message for processing, wherein the message queue comprises a plurality of email messages received from a plurality of senders;
identifying, by the MTA and based upon a sender determined for the first email message, a plurality of source internet protocol (IP) addresses comprising IP addresses usable as source IP addresses for the first email message;
selecting, by the MTA, a particular source IP address from the plurality of source IP addresses;
determining, by the MTA, a destination IP address for a recipient of the email message;
identifying, by the MTA and from a set of one or more proxy servers, a first proxy server that is configured to handle the selected particular source IP address, wherein a first set of the plurality of source IP addresses for the sender is assigned to the first proxy server in the set of proxy servers;
communicating, by the MTA and to the first proxy server, information including the particular source IP address and the destination IP address; and
transmitting, by the MTA, the first email message to the destination IP address using a connection established by the first proxy server between the particular source IP address and the destination IP address.

14. The system of claim 13, wherein selecting, by the MTA, the particular source IP address from the plurality of source IP addresses comprises determining, by the MTA, a set of active source IP addresses from the plurality of source IP addresses and selecting the particular source IP address from the set of active source IP addresses.

15. The system of claim 13, wherein a second set of the plurality of source IP addresses for the sender is allocated to a second proxy server in the set of proxy servers.

16. The system of claim 13, wherein the first proxy server in the set of proxy servers is configured to handle a set of source IP addresses, wherein a first source IP address in the set is associated with a first sender of the plurality of senders and a second source IP address in the set is associated with a second sender of the plurality of senders, wherein the first sender is different from the second sender.

17. The system of claim 13, wherein transmitting, by the MTA, the first email message to the destination IP address comprises receiving, from the proxy server, a message indicating that the connection was successfully established by the proxy server between the particular source IP address and the destination IP address.

18. A non-transitory computer-readable medium having program code that is stored thereon, the program code executable by one or more processing devices for performing operations comprising:
- executing, by an email delivery service, a message transfer agent (MTA) and a proxy server;
- selecting, by the MTA, from a message queue, a first email message for processing, wherein the message queue comprises a plurality of email messages received from a plurality of senders;
- identifying, by the MTA and based upon a sender determined for the first email message, a plurality of source internet protocol (IP) addresses comprising IP addresses usable as source IP addresses for the first email message;
- selecting, by the MTA, a particular source IP address from the plurality of source IP addresses;
- determining, by the MTA, a destination IP address for a recipient of the email message;
- identifying, by the MTA and from a set of one or more proxy servers, a first proxy server that is configured to handle the selected particular source IP address, wherein a first set of the plurality of source IP addresses for the sender is assigned to the first proxy server in the set of proxy servers;
- communicating, by the MTA and to the first proxy server, information including the particular source IP address and the destination IP address; and
- transmitting, by the MTA, the first email message to the destination IP address using a connection established by the first proxy server between the particular source IP address and the destination IP address.

19. The non-transitory computer-readable medium of claim 18 further comprising:
- identifying, by the MTA, a subset of email messages from the plurality of email messages that are associated with the sender; and
- transmitting, by the MTA, the subset of email messages to the destination IP address using the connection established by the proxy server between the particular source IP address and the destination IP address.

20. The non-transitory computer-readable medium of claim 19, wherein the number of messages in the subset of messages is determined based at least in part on a message limit associated with a domain of the recipient, wherein the message limit specifies the number of messages that can be transmitted using the connection established by the proxy server.

\* \* \* \* \*